(12) United States Patent
Baylon et al.

(10) Patent No.: US 9,794,555 B2
(45) Date of Patent: Oct. 17, 2017

(54) ADAPTIVE SAMPLING FILTER PROCESS FOR SCALABLE VIDEO CODING

(71) Applicant: General Instrument Corporation, Horsham, PA (US)

(72) Inventors: David M Baylon, San Diego, CA (US); Ajay K Luthra, San Diego, CA (US); Koohyar Minoo, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 701 days.

(21) Appl. No.: 14/213,150

(22) Filed: Mar. 14, 2014

(65) Prior Publication Data

US 2014/0269897 A1 Sep. 18, 2014

Related U.S. Application Data

(60) Provisional application No. 61/799,874, filed on Mar. 15, 2013.

(51) Int. Cl.
*H04N 19/59* (2014.01)
*H04N 19/82* (2014.01)
(Continued)

(52) U.S. Cl.
CPC ..... *H04N 19/00321* (2013.01); *H04N 19/117* (2014.11); *H04N 19/134* (2014.11);
(Continued)

(58) Field of Classification Search
CPC .......... H04N 19/00321; H04N 19/117; H04N 19/134; H04N 19/187; H04N 19/33; H04N 19/463; H04N 19/80
(Continued)

(56) References Cited

U.S. PATENT DOCUMENTS 6,931,084 B1 * 8/2005 Eberlein ............. H04L 27/2602
375/346
7,627,034 B2 * 12/2009 Park ..................... H04N 19/105
375/240.08
(Continued)

FOREIGN PATENT DOCUMENTS

WO 2013/174254 A1 11/2013
WO 2013/184954 A2 12/2013
(Continued)

OTHER PUBLICATIONS

PCT Search Report and Written Opinion, Re: Application #PCT/US2014/029023; dated Jul. 2, 2014.
(Continued)

*Primary Examiner* — Gims Philippe
*Assistant Examiner* — Yong Joon Kwon
(74) *Attorney, Agent, or Firm* — Thomas A. Ward

(57) ABSTRACT

A sampling filter process for scalable video coding provides correction for phase shift occurring during downsampling. The process uses video data obtained from an encoder or decoder process of a base layer (BL) in a multi-layer system using adaptive phase shifting based on downsampling to improve quality. Examples of a multi-layers are MPEG-4 Advanced Video Coding (AVC) and High Efficiency Video Coding (HEVC). The re-sampled BL data can be used in higher layers in a scalable video coding system. For example, the re-sampled or upsampled data can be used as a basis for prediction of the higher resolution video data.

2 Claims, 4 Drawing Sheets

(51) Int. Cl.
| | |
|---|---|
| *H04N 19/117* | (2014.01) |
| *H04N 19/186* | (2014.01) |
| *H04N 19/187* | (2014.01) |
| *H04N 19/182* | (2014.01) |
| *H04N 19/134* | (2014.01) |
| *H04N 19/463* | (2014.01) |
| *H04N 19/80* | (2014.01) |
| *H04N 19/33* | (2014.01) |

(52) U.S. Cl.
CPC ........... *H04N 19/187* (2014.11); *H04N 19/33* (2014.11); *H04N 19/463* (2014.11); *H04N 19/80* (2014.11)

(58) Field of Classification Search
USPC .................................................... 375/240.02
See application file for complete search history.

(56) References Cited

U.S. PATENT DOCUMENTS

| | | | |
|---|---|---|---|
| 2004/0008790 | A1 | 1/2004 | Rodriguez |
| 2006/0222067 | A1* | 10/2006 | Park ..................... H04N 19/105 375/240.08 |
| 2006/0268991 | A1* | 11/2006 | Segall ..................... H04B 1/66 375/240.24 |
| 2010/0322526 | A1* | 12/2010 | Lee ........................ H04N 19/70 382/232 |
| 2012/0268558 | A1* | 10/2012 | Choi ..................... H04N 19/597 348/42 |
| 2013/0329782 | A1* | 12/2013 | Seregin ............ H04N 19/00066 375/240.02 |
| 2014/0037015 | A1* | 2/2014 | Ye .......................... H04N 19/46 375/240.26 |
| 2014/0064386 | A1* | 3/2014 | Chen ................ H04N 19/00424 375/240.29 |
| 2015/0341661 | A1* | 11/2015 | Alshina .................. H04N 19/30 375/240.12 |

FOREIGN PATENT DOCUMENTS

| | | |
|---|---|---|
| WO | 2014025741 A2 | 2/2014 |
| WO | 2014/039547 A1 | 3/2014 |

OTHER PUBLICATIONS

J. Chen, et al., "Descrption of Scalable Video Coding Technology Proposal by Qualcomm (Configuration 2)", 11th JCT-VC Meeting (Joint Collaborative Team on Video Coding of ISO/IEC JTC1, SC29/WG11 and ITU-T SG.16), Oct. 2, 2012, 22 pgs.

S-W Park, et al., "Intra BL Prediction Considering Phase Shift", 15th JVT meeting (Joint Video Team of ISO/IEC JTC1/SC29/WG11 and ITU-T SG.16), Apr. 16, 2005, 16 pgs.

B. Bross, et al., "High Efficiency Video Coding (HEVC) Text Specification Draft 8", 10th JCT-VC Meeting (Joint Collaborative Team on Video Coding of ISO/IEC JTC1/SC29/WG11 and ITU-T SG.16), Jul. 23, 2012, 286 pgs.

K. Minoo, et al., "AHG13: SHVC Upsampling with Phase Offset Adjustment", 13th JCT-VC Meeting (Joint Video Team of ISO/IEC JTC1/SC29/WG11 and ITU-T SG.16), Apr. 11, 2013, 8 pgs.

K. Minoo, et al., "Non SCE1: On Handling Resampling Phase Offsets with Fixed Filters", 14th JCT-VC Meeting (Joint Video Team of ISO/IEC JTC1/SC29/WG11 and ITU-T SG.16), Jul. 26, 2013, 6 pgs.

J. Dong, et al., "Upsampling Based on Sampling Grid Information for Aligned Inter Layer Prediction", 13th JCT-VC Meeting (Joint Video Team of ISO/IEC JTC1/SC29/WG11 and ITU-T SG.16), Apr. 8, 2013, 10 pgs.

* cited by examiner x[m]

(1080p)
1080 x 1920 y'[n]

(4K)
2160 x 3840

ADAPTIVE SAMPLING FILTER PROCESS FOR SCALABLE VIDEO CODING

CROSS REFERENCE TO RELATED APPLICATION

This Application claims priority under 35 U.S.C. §119(e) from earlier filed U.S. Provisional Application Ser. No. 61/799,874 filed on Mar. 15, 2013 and incorporated herein by reference in its entirety.

BACKGROUND

Technical Field

The present invention relates to a sampling filter process for scalable video coding. More specifically, the present invention relates to re-sampling using video data obtained from an encoder or decoder process, where the encoder or decoder process can be MPEG-4 Advanced Video Coding (AVC) or High Efficiency Video Coding (HEVC).

Related Art

An example of a scalable video coding system using two layers is shown in FIG. 1. In the system of FIG. 1, one of the two layers is the Base Layer (BL) where a BL video is encoded in an Encoder E0, labeled 100, and decoded in a decoder D0, labeled 102, to produce a base layer video output BL out. The BL video is typically at a lower quality than the remaining layers, such as the Full Resolution (FR) layer that receives an input FR (y). The FR layer includes an encoder E1, labeled 104, and a decoder D1, labeled 106. In encoding in encoder E1 104 of the full resolution video, cross-layer (CL) information from the BL encoder 100 is used to produce enhancement layer (EL) information. The corresponding EL bitstream of the full resolution layer is then decoded in decoder D1 106 using the CL information from decoder D0 102 of the BL to output full resolution video, FR out. By using CL information in a scalable video coding system, the encoded information can be transmitted more efficiently in the EL than if the FR was encoded independently without the CL information. An example of coding that can use two layers shown in FIG. 1 includes video coding using AVC and the Scalable Video Coding (SVC) extension of AVC, respectively. Another example that can use two layer coding is HEVC.

FIG. 1 further shows block 108 with a down-arrow r illustrating a resolution reduction from the FR to the BL to illustrate that the BL can be created by a downsampling of the FR layer data. Although a downsampling is shown by the arrow r of block 108 FIG. 1, the BL can be independently created without the downsampling process. Overall, the down arrow of block 108 illustrates that in spatial scalability, the base layer BL is typically at a lower spatial resolution than the full resolution FR layer. For example, when r=2 and the FR resolution is 3840×2160, the corresponding BL resolution is 1920×1080.

The cross-layer CL information provided from the BL to the FR layer shown in FIG. 1 illustrates that the CL information can be used in the coding of the FR video in the EL. In one example, the CL information includes pixel information derived from the encoding and decoding process of the BL. Examples of BL encoding and decoding are AVC and HEVC. Because the BL pictures are at a different spatial resolution than the FR pictures, a BL picture needs to be upsampled (or re-sampled) back to the FR picture resolution in order to generate a suitable prediction for the FR picture.

FIG. 2 illustrates an upsampling process in block 200 of data from the BL layer to the EL. The components of the upsampling block 200 can be included in either or both of the encoder E1 104 and the decoder D1 106 of the EL of the video coding system of FIG. 1. The BL data at resolution x that is input into upsampling block 200 in FIG. 2 is derived from one or more of the encoding and decoding processes of the BL. A BL picture is upsampled using the up-arrow r process of block 200 to generate the EL resolution output y' that can be used as a basis for prediction of the original FR input y.

The upsampling block 200 works by interpolating from the BL data to recreate what is modified from the FR data. For instance, if every other pixel is dropped from the FR in block 108 to create the lower resolution BL data, the dropped pixels can be recreated using the upsampling block 200 by interpolation or other techniques to generate the EL resolution output y' from upsampling block 200. The data y' is then used to make encoding and decoding of the EL data more efficient.

SUMMARY

Embodiments of the present invention provide systems for the upsampling process from BL resolution to EL resolution to implement the upsampling of FIG. 2. The upsampling process of embodiments of the present invention includes three separate modules, a first module to select input samples from the BL video signal, a second module to select a filter for filtering the samples, and a third module using adaptive phase filtering to filter the input samples to recreate video that approximates the EL resolution video.

The filters can include separate row and column filters to enable parallel filter processing of samples along an entire row or column. The selection of filters can be represented as filters h[n;p], where the filters can be separable along each individual row or column, and p denotes a phase index selection for the filter. The output of the filtering process using the selected filter h[n;p] produces values that roughly recreate the FR data for the EL layer. The EL layer data predicted from the BL layer using the upsampling system enables prediction of the EL layer in the encoder and decoder to make the overall coding process in the EL layer more efficient.

The filters can be selected from a set of fixed filters each with different phase, or one or more adaptive or variable filters with a selectable phase offset. The variable filters can be configured by software to provide the functionality of the multiple fixed phase filters. When the phase positions of the pixels that are removed from the FR data to create the reduced resolution BL data are known, the filters can be used with phases set to interpolate and recreate the missing BL pixels for the re-sampling processes. Alternatively, or in the absence of knowing the appropriate phase offset information, the filters can be designed or derived with an estimate of phase based on the difference between the BL and FR data to minimize an error between the upsampled BL pixel data and the original FR input pixel data.

BRIEF DESCRIPTION OF THE DRAWINGS

Further details of the present invention are explained with the help of the attached drawings in which.

DETAILED DESCRIPTION

Figure 2:
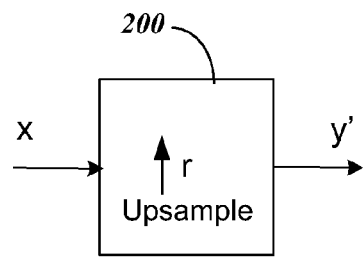
FIG. 2 illustrates an upsampling process that can be used to convert the base layer data to the full resolution layer data for FIG. 1.
Figure 3:
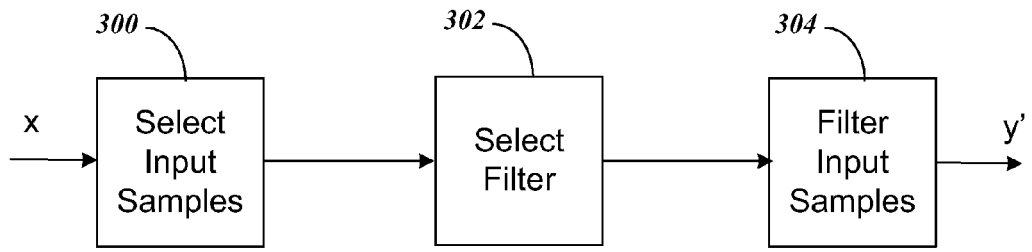
FIG. 3 shows a block diagram of components for implementing the upsampling process of FIG. 2.

FIG. 3 shows a general block diagram for implementing an upsampling process of FIG. 2 for embodiments of the present invention. The upsampling or re-sampling process can be determined to minimize an error E (e.g. mean-squared error) between the upsampled data y' and the full resolution data y. The system of FIG. 3 includes a select input samples module 300 that samples an input video signal. The system further includes a select filter module 302 to select a filter from the subsequent filter input samples module 304 to upsample the selected input samples from module 300.

In module 300, a set of input samples in a video signal x is first selected. In general, the samples can be a two-dimensional subset of samples in x, and a two-dimensional filter can be applied to the samples. The module 302 receives the data samples in x from module 300 and identifies the position of each sample from the data it receives, enabling module 302 to select an appropriate filter to direct the samples toward a subsequent filter module 304. The filter in module 304 is selected to filter the input samples, where the selected filter is chosen or configured to have a phase corresponding to the particular output sample location desired.

The filter input samples module 304 can include separate row and column filters. The selection of filters is represented herein as filters h[n; p], where the filters can be separable along each row or column, and p denotes a phase index selection for the filter. The output of the filtering process using the selected filter h[n;p] on the selected input samples produces output value y'.

Figure 4:
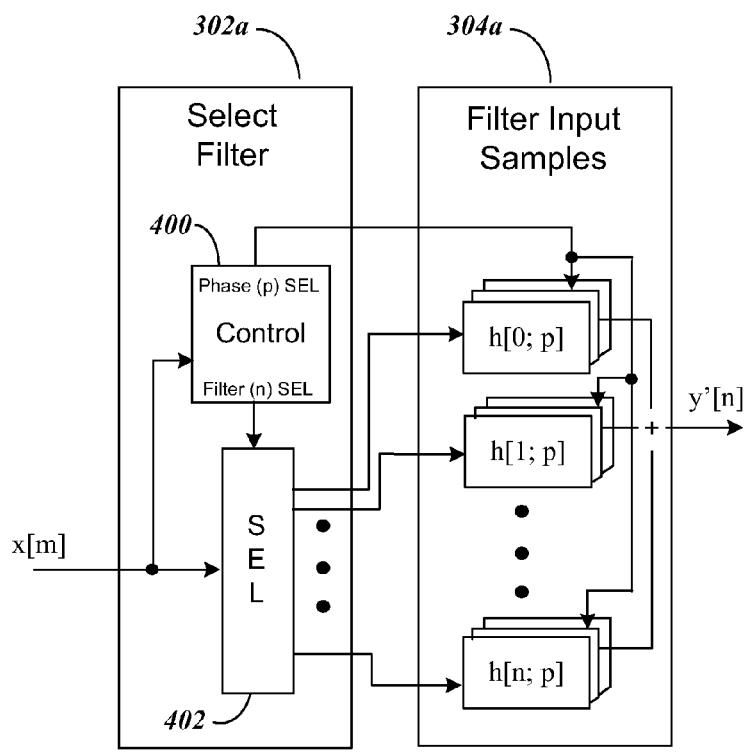
FIG. 4 shows components of the select filter module and the filters, where the filters are selected from fixed or adaptive filters to apply a desired phase shift.

FIG. 4 shows details of components for the select sample module 302 of FIG. 3 (labeled 302a in FIG. 4) and the filters module 304 of FIG. 3 (labeled 304a in FIG. 4) for a system with fixed filters. For separable filtering the input samples can be along a row or column of data. To supply a set of input samples from select input samples module 300, the select filter module 302a includes a select control 400 that identifies the input samples x[m] and provides a signal to a selector 402 that directs them through the selector 402 to a desired filter. The filter module 304a then includes the different filters h[n;p] that can be applied to the input samples, where the filter phase can be chosen among p phases from each row or column element depending on the output sample m desired. As shown, the selector 402 of module 302a directs the input samples to a desired column or row filter in 304a based on the "Filter (n) SEL" signal from select control 400. A separate select control 400 signal "Phase (p) SEL" selects the appropriate filter phase p for each of the row or column elements. The filter module 304a output produces the output y'[n].

In FIG. 4, the outputs from individual filter components h[n;p] are shown added "+" to produce the output y'[n]. This illustrates that each box, e.g. h[0;p], represents one coefficient or number in a filter with phase p. Therefore, the filter with phase p is represented by all n numbers in h[0,p], . . . , h[n−1;p]. This is the filter that is applied to the selected input samples to produce an output value y'[n], for example, y'[0]=h[0,p]*x[0]+h[1,p]*x[1]+ . . . +h[n,p]*x[n], requiring the addition function "+" as illustrated. As an alternative to adding in FIG. 4, the "+" could be replaced with a solid connection and the output y'[n] would be selected from one output of a bank of p filters representing the p phases, with the boxes h[n:p] in module 304a relabeled, for example, as h[n;0], h[n,1], . . . , h[n,p−1] and now each box would have all the filter coefficients needed to form y'[n] without the addition element required.

Although the filters h[n:p] in module 304a are shown as separate phase fixed devices, they can be implemented using a single filter with phase p selected and adaptively controlled. The adaptive phase filters can be reconfigured by software. The adaptive filters can thus be designed so that each filter h[n;p] corresponds to a desired phase p. The filter coefficients h[n;p] can be signaled in the EL from the encoder so that the decoder can reconstruct a prediction to the FR data.

Phase selection for the filters h[n:p] enables recreation of the FR layer from the BL data. For example, if the BL data is created by removing every other pixel of data from the FR, to recreate the FR data from the BL data, the removed data must be reproduced or interpolated from the BL data available. In this case, depending on whether even or odd indexed samples are removed, the appropriate filter h[n;p] with phase p can be used to interpolate the new data. The selection of p different phase filters from the filters h[n:p] allows the appropriate phase shift to be chosen to recreate the missing data depending on how the BL data is downsampled from the FR data.

Figure 5:
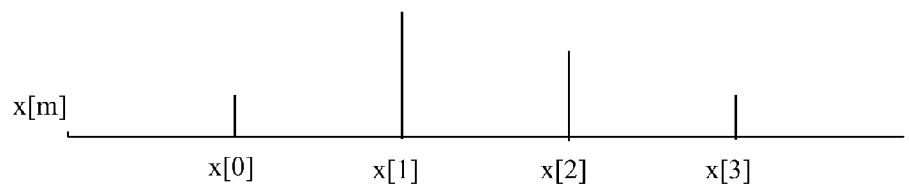
FIG. 5 illustrates an example of input samples x[m] provided to the upsampling system of FIG. 4.
Figure 6:
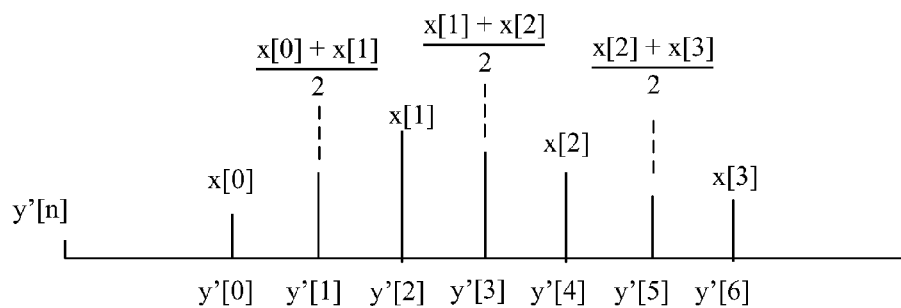
FIG. 6 illustrates outputs y'[n] created from the samples x[m] of FIG. 5 using the upsampling system of FIG. 4 when the BL video is downsampled by removing every other element from the FR video.

FIGS. 5-6 illustrate use of the system of the upsampling system of FIG. 4 where either even or odd samples are removed to create the BL data from the FR data. FIG. 5 illustrates samples x[m] including input samples x[0] through x[3] which are created by removing either even or odd samples from FR data. The system of FIG. 4 will use the select filter 302a control 400 to direct the samples x[m] of FIG. 5 to individual filters 304a of a row or column, and further control 400 will select the phase p of filters 304a to provide output y'[n] as illustrated in FIG. 6. As shown in FIG. 6, the sample x[0] will be provided as y'[0] and sample x[1] will be y'[2]. In one example, averaging can be performed to recreate the data element y'[1] as the average of y'[0] and y'[2] which are its two adjacent data points to yield (x[0]+x[1])/2. The next data element after y'[2], which is element y'[3], will be recreated as the average of its adjacent data points y'[2] and y'[4], or (x[1]+x[2])/2, and so forth.

Note that when the output y'[n] provides the same number of samples as the input x[m] then no samples will have been dropped from the FR layer to form the BL layer, and the BL data will be the same resolution as the FR layer. In the examples of FIGS. 5-6, since ½ of the total samples is dropped, y'[n] will provide twice the number of samples compared to x[m] from the BL.

Figure 7:
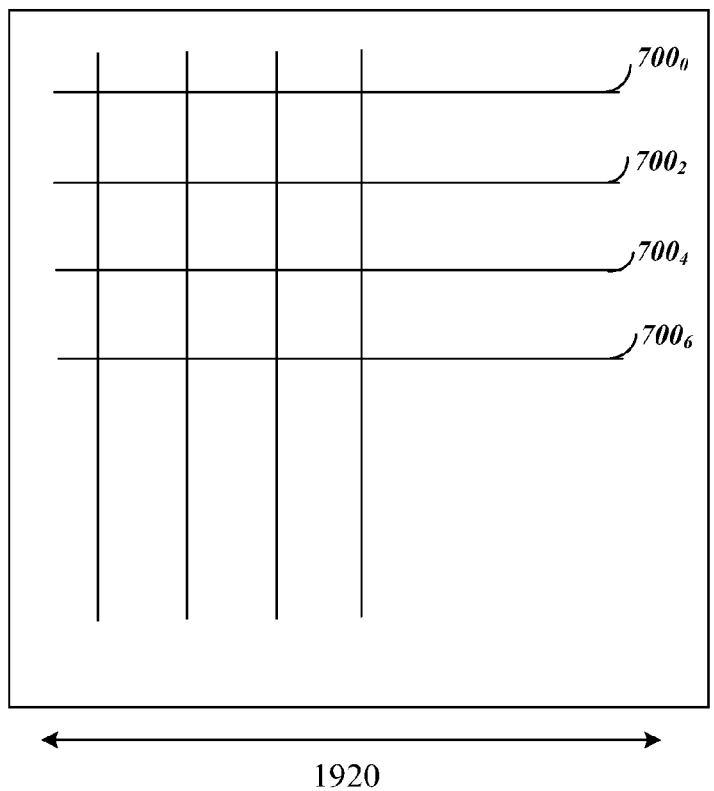
FIG. 7 illustrates both rows and columns of input samples x[m] from FIG. 5 when the BL picture is 1080 p.
Figure 8:
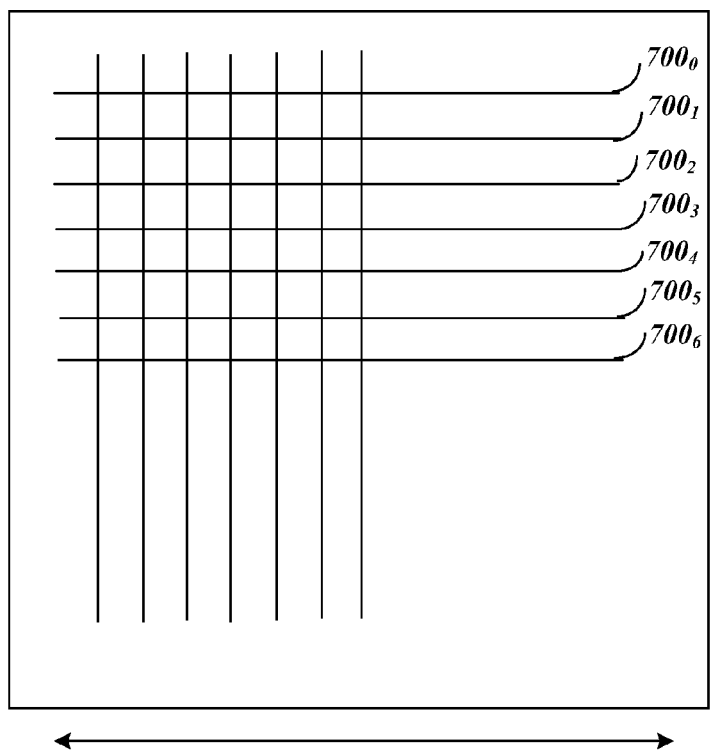
FIG. 8 illustrates both row and column outputs y'[n] when the 1080p picture of FIG. 7 is upsampled to reproduce every other element to create a FR 4K video.

FIGS. 7-8 illustrate how continuing to perform the data upsampling from FIG. 5 to FIG. 6 for additional rows or columns will enable recreation of an entire picture. Assuming that FIGS. 5-6 illustrate upsampling for a row, FIGS. 7-8 expand the example to multiple rows and columns. Assuming FIG. 5 shows one row x[0]-x[3], that row can be comparable to row $700_0$ in FIG. 7. Additional rows and columns of samples x[m] can be processed from the entire BL data picture of FIG. 7, such as row $700_2$, $700_4$ and $700_6$. FIG. 7 is shown to illustrate 1080p which has a picture size of 1080×1920 pixels. FIG. 8 is 2× the size of 1080 p or a 4K picture which has dimensions 2160×3840. Thus the 1080 p picture of FIG. 7 can be the downsampled version with odd or even samples removed from a 4K picture. Thus, by interpolating the data x[m] of FIG. 7 to reproduce removed odd or even samples in an upsampling system as shown in FIG. 4, FIG. 8 will be created as output data y'[n]. The y'[n] data of FIG. 8 will then be the upsampled version of FIG. 7 and will illustrate all columns and rows of a picture being upsampled, as opposed to a single column or row of FIG. 6. The illustration of FIG. 8 shows production of all or rows $700_0$-$700_6$ to fill in the odd rows from FIG. 7.

Figure 1:
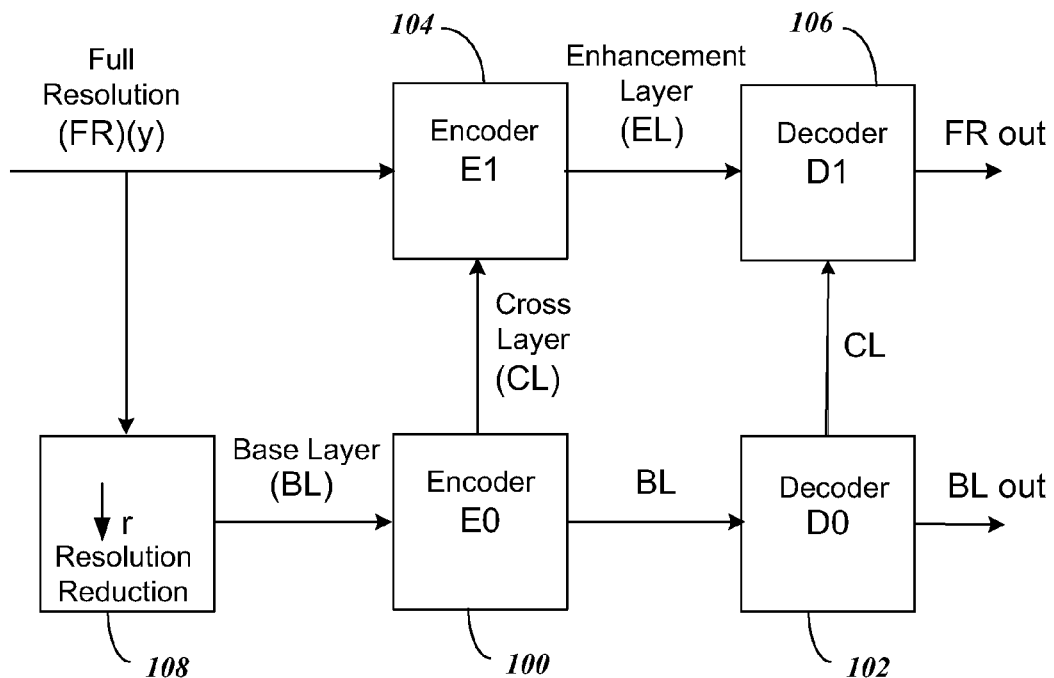
FIG. 1 is a block diagram of components in a scalable video coding system with two layers.

Although the simple averaging of data for interpolation is shown in FIG. 6, such as data point y'[1]=(x[0]+x[1])/2, as described above, more complicated formulas can be used to determine dropped data. To provide these more complex formulas, the phase p in the filters h[n;p] can be adaptable to provide complex values rather than simple fixed values. Such adaptable p values can be varied in software. For the adaptable or variable filters, the filter coefficients h[n;p] can be signaled in the EL so that the encoder 104 of FIG. 1 can reconstruct a prediction to the FR data. However, if an adaptable p value is used in the EL encoder 104, then the filter coefficients in some cases will need to be transmitted to the EL decoder 106 to enable encoding and decoding using the same phase offset for each sample. With fixed filters and data provided that will be reproduced with a predictable phase offset, the filter coefficients would not be necessary to transmit from the encoder 104 to the decoder 106.

For more specific or complex phase shift selection, the module 304*a* of FIG. 4 can be implemented with a set of M filters h, where for the output value y[n] at output index m, the filter h[n; m mod M] is chosen and is applied to the corresponding input samples x. The filters h[n; p] where p=m mod M generally correspond to filters with M different phase offsets, for example with phase offsets of p/M, where p=0, 1, . . . , M−1.

Selection criteria for determining a filter phase are applied by the select control 400 of the select filter module 302*a* in FIG. 4. The optimal filter phase p=m mod M to choose for output index m can depend on how the lower resolution BL x[m] was generated, as described above. For example, assume that M=8. In the case of downsampling by a factor of 2 from FR to BL, if the BL samples were generated using a zero phase filter (or a set of filters with zero phase), then the corresponding filters h[n, p] for upsampling by a factor of 2 can be selected to correspond to output filter phases of p=0 (0), 4 (4/8) when M=8. On the other hand, if the BL samples where generated with a non-zero phase shift q (such as when preserving 420 color space sampling positions in the BL), for example q=¼, then the corresponding filters for upsampling by 2 can be selected to correspond to different output filter phases, for example p=7 (⅛), 3 (⅜).

For the upsampling process components for FIG. 4, embodiments of the present invention contemplate that the components can be formed using specific hardware components as well as software modules. For the software modules, the system can be composed of one or more processors with memory storing code that is executable by the processor to form the components identified and to cause the processor to perform the functions described. More specifics of filter designs that can be used with the components of FIG. 4 are described in the following sections.

1. Filter Design for Adaptive Phase Shift

As described previously, any phase offset applied in generating the downsampled BL data from the FR data should be accounted for in the corresponding upsampling process in order to improve the performance of the FR prediction. One way to achieve this is by specifying the appropriate phases of the filters 304 used for the re-sampling processes. As indicated above, the filters 304 can be configured as adaptive as illustrated in FIG. 4 to enable more precise phase control to improve predicted data in the upsampling process.

In the absence of knowing any information about the appropriate phase, the filters 304 can be designed or derived based on only the BL and FR data. That is, given the BL pixel data, the filters are derived, for example, to minimize an error between the upsampled BL pixel data and the original FR input pixel data. Note that the designed filters are upsampling filters as opposed to filters which are designed after the BL has been upsampled, e.g. by using some filters with fixed filtering coefficients. The filter(s) can be derived based on current or previously decoded data. In minimizing the error between the upsampled BL and FR, the designed filter(s) will implicitly have the appropriate phase offset(s).

The specified or derived filter coefficients used in the upsampling of FIG. 4 can be transmitted in the EL, or a difference between the coefficients and a specified (or predicted) set of coefficients can be transmitted to enable filter selection. With adaptive phase shift filtering in FIG. 4, the set of phases for which the p filters h[n;p] represent need not be uniformly spaced. The coefficient transmission can be made at some unit level (e.g. sequence parameter set (SPS), picture parameter set (PPS), slice, largest coding unit (LCU), coding unit (CU), prediction unit (PU), etc.) and per color component. Furthermore several sets of filters can be signaled per sequence, picture or slice and the selection of which set to be used for re-sampling can be signaled at finer levels, for example at picture, slice, LCU, CU or PU level.

2. Separable Column and Row Filtering

For the re-sampling process, in one embodiment the filters applied can be separable, and the coefficients for each horizontal (row) and vertical (column) dimension can be signaled or selected from a set of filters. This is illustrated by the filters h[n;p] in FIG. 4 that provide separate filters for either an individual row or column. The processing of row or columns separably allows for flexibility in filter characteristics (e.g. phase offset, frequency response, number of taps, etc.) in both dimensions while retaining the computational benefits of separable filtering.

The separable filtering in the re-sampling process can be specified as row filtering first or column filtering first, as the order may affect the memory or computational requirements. In the case of deriving filters based on only the BL and FR data as described previously, note that if row filtering and re-sampling is performed first, the estimation of the filters used for column filtering can be done based on the re-sampled row data (or vice-versa). As described previously, the filter coefficients can be transmitted in the EL, or a difference between the coefficients and a specified (or predicted) set of coefficients can be transmitted.

3. Filter Data Used After Deblocking and SAO processing

In the re-sampling or upsampling process, pixel data from the encode/decode process from the BL is used to generate a prediction for the FR pixel data. The BL pixel data can be extracted at various points in the decoding process. To enable reconstruction of the original data for the EL coding the extracted BL pixel data is used. For example, in AVC coding a deblocking filter (DBF) can be applied for data reconstruction. HEVC coding specifies two filtering processes that are applied for data reconstruction, with a deblocking filter (DBF) applied first and the sample adaptive offset (SAO) filter applied afterwards. The SAO filter is applied after the DBF and is made to allow for better reconstruction of the original signal amplitudes by using SAO parameters that are transmitted to the decoder.

For the case of HEVC and AVC, the BL pixel data used for re-sampling can either be applied before or after the deblocking process. And for the case of HEVC, the BL pixel data used can either be with or without SAO processing. In one embodiment for an AVC and HEVC BL, signaling is provided to indicate whether the BL data for re-sampling is deblocked data or not. For an HEVC BL, if the data has been deblocked, signaling is further provided to indicate whether the BL data for re-sampling has been further processed with SAO or not.

4. Phase Offset Compensation

In generating the BL, non-zero phase shift q may apply globally over an entire picture. The global phase shift may, however, be different per color component and per dimension. Depending on the phase shift q used during downsampling, an appropriate phase shift p may be required in upsampling. If this phase shift p (or q) is known at the encoder, it can be transmitted to the decoder in the EL bitstream. In the upsampling process, the decoder can then select a filter with a phase offset that is shifted by p from the filter that would have otherwise been selected with q=0.

As an example of phase offset compensation, for the case of 420 color sampling, if it is assumed that all layers maintain the correct 420 chroma sampling positions, it is possible to determine what the phase shift $p\_c$ should be relative to the input chroma samples without having to explicitly transmit $p\_c$. Instead of being transmitted, the chroma phase shift $p\_c$ for re-sampling can be computed based upon known information about the BL and FR spatial resolutions. For example, for downsampling by a factor of r, to maintain the 420 chroma sampling positions the vertical chroma phase offset should be $q\_c=(r-1)/4$ while the horizontal chroma phase offset should be $q\_c=0$. As a consequence, for complementary upsampling by a factor of r, the vertical chroma phase offset should be $p\_c=-q\_c/r=(1-r)/(4r)$ while the horizontal chroma phase offset should be $p\_c=0$.

Although the present invention has been described above with particularity, this was merely to teach one of ordinary skill in the art how to make and use the invention. Many additional modifications will fall within the scope of the invention as that scope is defined by the following claims.

What is claimed:

1. A system for scalable video coding comprising:
    a first coding layer for coding video with a base resolution;
    a second coding layer for coding video with an enhanced resolution having a higher resolution than the base resolution;
    an upsampling unit receiving sampling signals from the first coding layer and providing an output signal to the second coding layer after an upsampling process, wherein the upsampling unit output signal enables more efficient coding in the second coding layer,
    wherein the first coding layer is downsampled from the second coding layer, and wherein a global phase offset generated in the downsampling is calculated during the upsampling to provide the output signal from the upsampling unit
    wherein phase shift $q\_c$ is used during downsampling,
    wherein phase shift $p\_c$ is used during upsampling,
    wherein r is a factor used in downsampling from the enhanced resolution to the base resolution and in upsampling from the base resolution to the enhanced resolution,
    and
    wherein the phase shift $q\_c$ and the phase shift $p\_c$ provide a vertical chroma phase offset, respectively in the downsampling and upsampling, with the phase shift $q\_c=(r-1)/4$ and
    wherein the downsampling by the factor of r and the upsampling by the factor of r, the phase shift $p\_c=-q\_c/r=(1-r)/(4r)$ is calculated as the global phase offset.

2. The system for scalable video coding of claim 1, wherein the global phase offset used in upsampling is computed by a decoder in the second coding layer.